(12) United States Patent
Kato

(10) Patent No.: US 7,825,955 B2
(45) Date of Patent: Nov. 2, 2010

(54) IMAGE PICKUP APPARATUS, EXPOSURE CONTROL METHOD, AND COMPUTER PROGRAM INSTALLED IN THE IMAGE PICKUP APPARATUS

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 734 days.

(21) Appl. No.: 11/214,163

(22) Filed: Aug. 29, 2005

(65) Prior Publication Data

US 2006/0044459 A1    Mar. 2, 2006

(30) Foreign Application Priority Data

Aug. 31, 2004   (JP)  ............... 2004-252133

(51) Int. Cl.
*H04N 5/235*    (2006.01)
(52) U.S. Cl. .................................. 348/221.1
(58) Field of Classification Search .......... 348/362, 348/221.1
See application file for complete search history.

(56) References Cited

U.S. PATENT DOCUMENTS

| | | | |
|---|---|---|---|
| 5,184,172 A | | 2/1993 | Miyazaki |
| 5,677,733 A | | 10/1997 | Yoshimura et al. |
| 5,831,676 A | * | 11/1998 | Takahashi et al. ......... 348/362 |
| 6,583,820 B1 | * | 6/2003 | Hung ....................... 348/362 |
| 6,879,345 B2 | * | 4/2005 | Kawanishi ................ 348/362 |
| 7,002,632 B2 | | 2/2006 | Takahashi |
| 7,024,108 B2 | | 4/2006 | Takahashi |
| 2002/0163587 A1 | | 11/2002 | Takahashi |
| 2003/0184673 A1 | | 10/2003 | Skow |

FOREIGN PATENT DOCUMENTS

| | | |
|---|---|---|
| EP | 0 488 442 A2 | 6/1992 |
| JP | 2002-84455 A | 3/2002 |
| JP | 2002-277918 A | 9/2002 |
| JP | 2002-369074 A | 12/2002 |

(Continued)

OTHER PUBLICATIONS

English Translation of Japanese Patent Application No. 2003-008986, Published Jan. 10, 2003.*

(Continued)

*Primary Examiner*—Jason Chan
*Assistant Examiner*—Gary C Vieaux
(74) *Attorney, Agent, or Firm*—Holtz, Holtz, Goodman & Chick, PC

(57) ABSTRACT

Immediately before regular image pickup, a reference image is taken through exposure control by center-weighted photometry. A histogram indicative of a luminance distribution of all pixels is generated on the basis of luminance information of the reference image. Then, a luminance point in the histogram where the accumulated number of pixels from the high-luminance side is equal to a half of the total number of pixels is obtained, and a difference is calculated between the luminance point and a luminance point ("118") when the brightness is uniform in the reference image. At the time of regular image pickup, proper exposure determined in response to the brightness of the subject when the reference image is taken is compensated with the previously calculated difference, and exposure control for the compensated proper exposure is performed.

5 Claims, 12 Drawing Sheets

FOREIGN PATENT DOCUMENTS

JP         2003-8986 A      1/2003
JP         2003008986 A   *  1/2003

OTHER PUBLICATIONS

Murakami, M., et al, "An Exposure Control System of Video Cameras Based on Fuzzy Logic Using Color Information" Proceedings of the Fifth IEEE International Conference on Fuzzy System. vol. 3. Sep. 8. 1996, pp. 2161-2187, XP 002356822, ISBN: 0-7803-3645.

Korean Office (and English language translation) dated Feb. 29, 2008, issued in a counterpart Korean Application.

\* cited by examiner

| BRIGHTNESS (LV) | TARGET LUMINANCE POINT (Y2max) (IN 8-BIT NOTATION) |
|---|---|
| LESS THAN 12.5 | 143 |
| 12.5 OR MORE AND LOWER THAN 13.0 | 151 |
| 13.0 OR MORE AND LESS THAN 13.5 | 159 |
| 13.5 OR MORE AND LESS THAN 14.0 | 167 |
| 14.0 OR MORE AND LESS THAN 14.5 | 175 |
| 14.5 OR MORE AND LESS THAN 15.0 | 183 |
| 15.0 OR MORE AND LESS THAN 15.5 | 191 |
| 15.5 OR MORE AND LESS THAN 16.0 | 199 |
| 16.0 OR MORE | 207 |

FIG.12A
Prior Art

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG.12B
Prior Art

| D | D | D | D | D | D | D | D |
|---|---|---|---|---|---|---|---|
| D | C | C | C | C | C | C | D |
| D | C | B | B | B | B | C | D |
| D | C | B | A | A | B | C | D |
| D | C | B | A | A | B | C | D |
| D | C | B | B | B | B | C | D |
| D | C | C | C | C | C | C | D |
| D | D | D | D | D | D | D | D | ately before the
IMAGE PICKUP APPARATUS, EXPOSURE CONTROL METHOD, AND COMPUTER PROGRAM INSTALLED IN THE IMAGE PICKUP APPARATUS

CROSS-REFERENCE TO RELATED APPLICATIONS

This application is based upon and claims the benefit of priority from prior Japanese Patent Application No. 2004-252133, filed Aug. 31, 2004, the entire contents of which are incorporated herein by reference.

BACKGROUND OF THE INVENTION

1. Field of the Invention

The present invention relates to an image pickup apparatus and an exposure control method preferable for use in, for example, a digital camera.

2. Description of the Related Art

Conventionally, an image pickup apparatus such as a silver-halide camera, a digital camera, or a video camera has an automatic exposure (AE) function for determining exposure corresponding to the brightness of a subject and controlling the shutter speed, the aperture and the like. The exposure control action involves a known photometry method for measuring the brightness of a subject, such as average photometry for measuring the brightness throughout the subject, center-weighted photometry for weighting at the center area, multi-photometry in which photometry regions are provided at a plurality of areas on a subject, and spot photometry for measuring the brightness at a specific part of a subject. In common, a digital camera measures the brightness (luminance) of a subject through center-weighted photometry when a taken image of the subject is displayed on its electronic view finder such as a liquid crystal monitor (at the monitor through mode).

In exposure control through center-weighted photometry, for example, an image of a subject is divided into 64 blocks, 8 vertically by 8 horizontally, as shown in FIG. 12A. In addition, the blocks are classified into blocks A in the center area (indicated by the bold line) and other blocks B, C, and D in the peripheral area as shown in FIG. 12B. Further, the blocks A, B, C, and D are weighted 16 times, 8 times, 4 times, and one time, respectively, as the weighting becomes greater from the peripheral area to the center area. Then, an average value of the luminance (Ysum_average) is calculated from an integration value of the luminance of the divided blocks with the weighting factor (weight[n]) using the following Equation 1 and used as a fixed target value (in general, a value when the subject appears in gray color as having a reflectivity of 18%).

$$Ysum\_average = \sum_{n=0}^{N=63}(\text{sum}[n] \times \text{weight}[n]) / \sum_{n=0}^{N=63} \text{weight}[n]$$

The exposure control through the average photometry or multi photometry is suitable for achieving exposure corresponding to the brightness throughout the subject. It is, however, impractical to determine the optimum exposure over different phases of the subject. In particular, a difference in brightness between the main subject and its surrounding area will hardly be overcome. An attempt for eliminating such a drawback has been proposed by the same applicant (see Jpn. Pat. Appln. KOKAI Publication No. 2003-8986 (Pat. Document 1)).

The attempt starts with providing as a reference image a subject image taken at the monitor through mode (prior to photographing) using AE by center-weighted photometry and acquiring a histogram indicative of distribution of luminance components in each of a primary region where the subject is supposed to be present and the entire area of the reference image. An exposure compensation possible amount (A) at the positive side indicative of a range in which no white flickers occur in the primary region even with exposure control is obtained on the basis of the histogram in the primary region. Also, a required exposure compensation amount (B) determined to be needed for obtaining proper exposure is calculated on the basis of the histogram in the entire area of the reference image. The exposure control is then carried out based on the required exposure compensation amount (B) with limitation of the exposure compensation possible amount (A). When the exposure compensation possible amount (A) is a negative value, the exposure control action is carried out based on the exposure compensation possible amount (A) but not the required exposure compensation amount (B). According to such a method, the exposure control can be carried out in response to the brightness throughout the image in a range in which the main subject (in the primary region) remains free from white flickers.

However, although the above-described exposure control method is capable of attenuating the occurrence of white flickers on the main subject in its primary region, the image will appear dimmer than the actual view when the center area of the subject is remarkably bright, or more glaring than the actual view when the center area of the subject is remarkably dark because the required exposure compensation amount (B) as a reference for the exposure control is a compensation value based on an EV value corresponding to the brightness of the subject when the reference image is simply taken.

It is hence an object of the present invention, in view of the foregoing drawback, to provide an image pickup apparatus and an exposure control method where the brightness throughout a taken image is controlled to a level closer to the actual level while remaining at a desired level in a predetermined region of the taken image.

BRIEF SUMMARY OF THE INVENTION

According to a preferable aspect of the present invention, there is provided an image pickup apparatus having image pickup means for imaging a subject, comprising:

weighting means for weighting luminance information of pixels in a predetermined area with respect to luminance information of the subject image taken by the image pickup means;

exposure control means for conducting an exposure at the time of imaging the subject by the image pickup means on the basis of the luminance information obtained by weighting the luminance information of pixels in the predetermined area by the weighting means;

relevant information acquisition means for acquiring relevant information indicative of a difference in brightness between the predetermined area and the other area than the predetermined area of a reference image, which has been taken by an image pickup operation involving the exposure control of the exposure control means immediately before the subject is regularly imaged by the image pickup means, on the basis of luminance information of the reference image;

storage means for storing proper exposure information indicative of proper exposure corresponding to the brightness of the subject;

photometry means for measuring the brightness of the subject when the reference image is taken by the image pickup means;

compensating means for compensating the proper exposure information stored in the storage means in response to the brightness of the subject measured by the photometry means, in accordance with the difference in brightness indicated by the relevant information acquired by the relevant information acquisition means; and control means for causing the exposure control means to perform exposure control for proper exposure indicated by the proper exposure information after compensated by the compensating means when the subject is regularly imaged by the image pickup means.

According to another preferable aspect of the present invention, there is provided an exposure control method for use in an image pickup apparatus having image pickup means for imaging a subject, the method comprising:

a step of weighting luminance information of pixels in a predetermined area with respect to luminance information of the subject image taken by the image pickup means and acquiring a reference image by performing exposure control based on the weighted luminance information, immediately before the subject is regularly imaged by the image pickup means;

a step of acquiring relevant information indicative of a difference in brightness between the predetermined area and the other area than the predetermined area of a reference image on the basis of luminance information of the reference image;

a step of compensating proper exposure information indicative of proper exposure determined in response to the brightness of the subject when the reference image is taken, in accordance with the difference in brightness indicated by the relevant information; and a step of performing exposure control for proper exposure indicated by the compensated proper exposure information when the subject is regularly imaged by the image pickup means.

According to still another preferable aspect of the present invention, there is provided a program for causing a computer in an image pickup apparatus having image pickup means for imaging a subject to function as:

weighting means for weighting luminance information of pixels in a predetermined area with respect to luminance information of the subject image taken by the image pickup means;

exposure control means for conducting an exposure at the time of imaging the subject by the image pickup means on the basis of the luminance information obtained by weighting the luminance information of pixels in the predetermined area by the weighting means;

relevant information acquisition means for acquiring relevant information indicative of a difference in brightness between the predetermined area and the other area than the predetermined area of a reference image, which has been taken by an image pickup operation involving the exposure control of the exposure control means immediately before the subject is regularly imaged by the image pickup means, on the basis of luminance information of the reference image;

photometry means for measuring the brightness of the subject when the reference image is taken by the image pickup means;

compensating means for compensating the proper exposure information stored in the storage means in response to the brightness of the subject measured by the photometry means, in accordance with the difference in brightness indicated by the relevant information acquired by the relevant information acquisition means; and control means for causing the exposure control means to perform exposure control for proper exposure indicated by the proper exposure information after compensated by the compensating means when the subject is regularly imaged by the image pickup means.

The present invention allows the brightness throughout a taken image to be controlled to a level closer to the actual level while remaining at a desired level in a target region of the taken image.

BRIEF DESCRIPTION OF THE SEVERAL VIEWS OF THE DRAWING

FIGS. 12A and 12B illustrate a method of measuring luminance on a subject by center-weighted photometry.

DETAILED DESCRIPTION OF THE INVENTION

Figure 1:
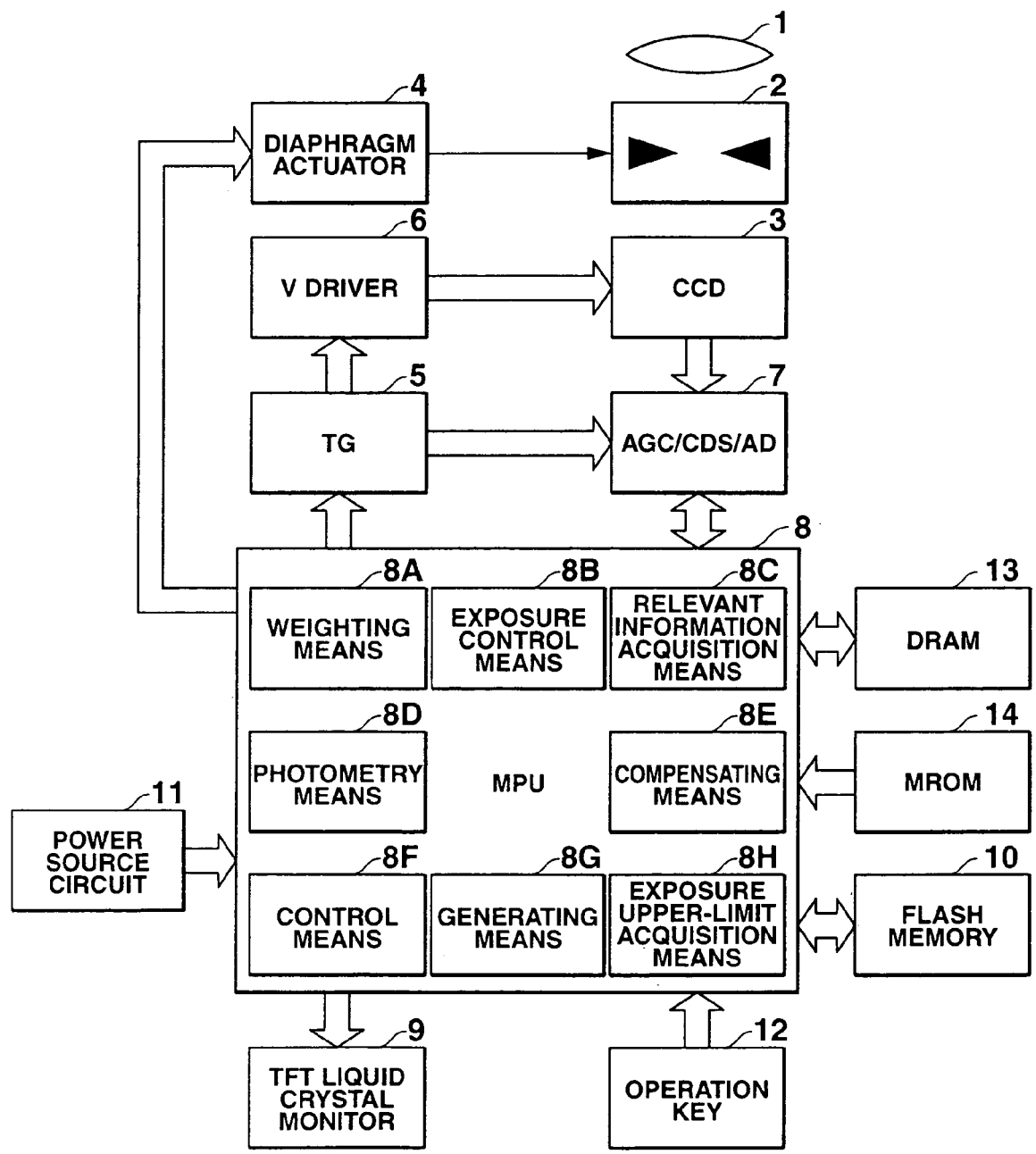
FIG. 1 is a block diagram of a digital camera showing one embodiment of the present invention.

One embodiment of the present invention will be described with reference to the accompanying drawings. FIG. 1 is a block diagram showing an electrical arrangement of a digital camera according to the present invention.

The digital camera has an automatic exposure (AE) function, and comprises a CCD 3 serving as image pickup means for taking an image of the subject focused through a stationary lens 1 and a diaphragm 2, a diaphragm actuator 4 for changing an aperture of the diaphragm 2, a timing generator (TG) 5 and a vertical driver (V driver) 6 for driving the CCD 3, and an analog signal processor 7. The analog signal processor 7 includes a correlated double sampling (CDS) circuit for holding an image pickup signal output from the CCD 3, an automatic gain control (AGC) amplifier provided as an analog amplifier to which the image pickup signal is supplied from the CDS circuit, and an analog-to-digital converter for converting the analog image pickup signal amplified and adjusted by the AGC amplifier into a digital signal. The output signal of the CCD 3 is matched at black level and sampled to be transmitted to an MPU 8 as a digital signal. The CCD3 also functions as an electronic shutter by changing the charge accumulation period according to a shutter pulse transmitted from the MPU 8. The aperture of the diaphragm 2 is controlled by a control signal transmitted from the MPU 8 to the diaphragm actuator 4.

The MPU 8 is provided for performing various signal processing such as a color signal processing and image processing to the image pickup signal which has been output from the CCD 3 and converted into a digital signal through the analog signal processor 7, generating a video signal and displaying the taken image of the subject as a through image on a TFT liquid crystal monitor 9. Also, the MPU 8 compresses the image pickup signal to generate an image file of a predetermined format and stores the image file in a flash memory 10 during photographing, and expands the compressed image file to be displayed on the TFT liquid crystal monitor 9 during reproduction.

Moreover, the MPU 8 is connected with a power circuit 11 including a power source such as a battery, a operation key unit 12 including various switches such as a shutter key, a DRAM 13, and an MROM 14. The DRAM 13 is provided as a work memory for the MPU 8 and also functions as an image memory for storing one frame of the image pickup signal which has been converted into a digital signal through the analog signal processor 7 during photographing.

Figure 2:
FIG. 2 illustrates an optimum luminance distribution table.

The MROM 14 is a program ROM having stored therein operation programs necessary for the control of the respective units by the MPU 8 and various data processings. Particularly the MROM 14 stores programs for causing the MPU 8 to function as weighting means 8A, exposure control means 8B, relevant information acquisition means 8c, photometry means 8D, compensating means, control means 8E, generating means 8G, and exposure upper-limit acquisition means 8H in such a manner that the MPU 8 is caused to carry out the operations which will be explained later at the time of exposure control in the photographing mode. Further, the MROM 14 is storage means of the invention, which stores data of an optimum luminance distribution table T including the brightness (LV) of the subject and the target luminance point corresponding thereto as shown in FIG. 2. The brightness (LV) of the subject in the optimum luminance distribution table T is equal to the exposure value (EV) (LV=EV) when the IOS index is set to 100 (SV=5). The target luminance point is data of the luminance value in 8-bit notation.

The MROM 14 may be a rewritable memory in which programs or storage data can be rewritten as desired. Alternatively, the digital camera may have a configuration that some or all of programs or storage data are stored in the flash memory 10 or supplied from the outside via other equipment such as any recording medium detachably connected with the digital camera or a personal computer.

Figure 3:
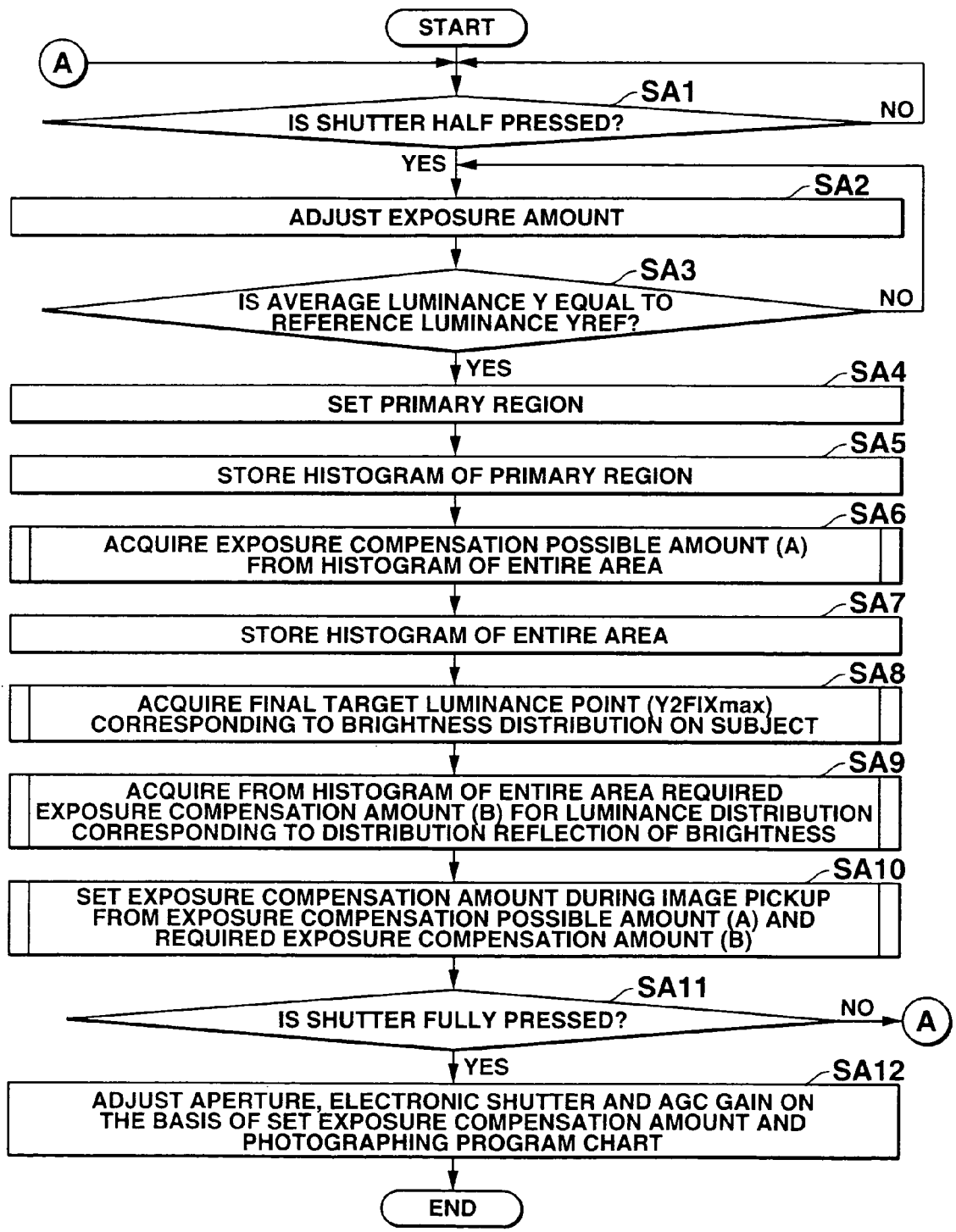
FIG. 3 is a flowchart showing operation relating to automatic exposure control.

The operation relating to automatic exposure control in the digital camera of the embodiment having the configuration will now be described. FIG. 3 is a flowchart showing the operation when the photographing mode has been selected for displaying a through image on the TFT liquid crystal monitor 9 and accordingly the photographing standby state has been established.

Figure 9:
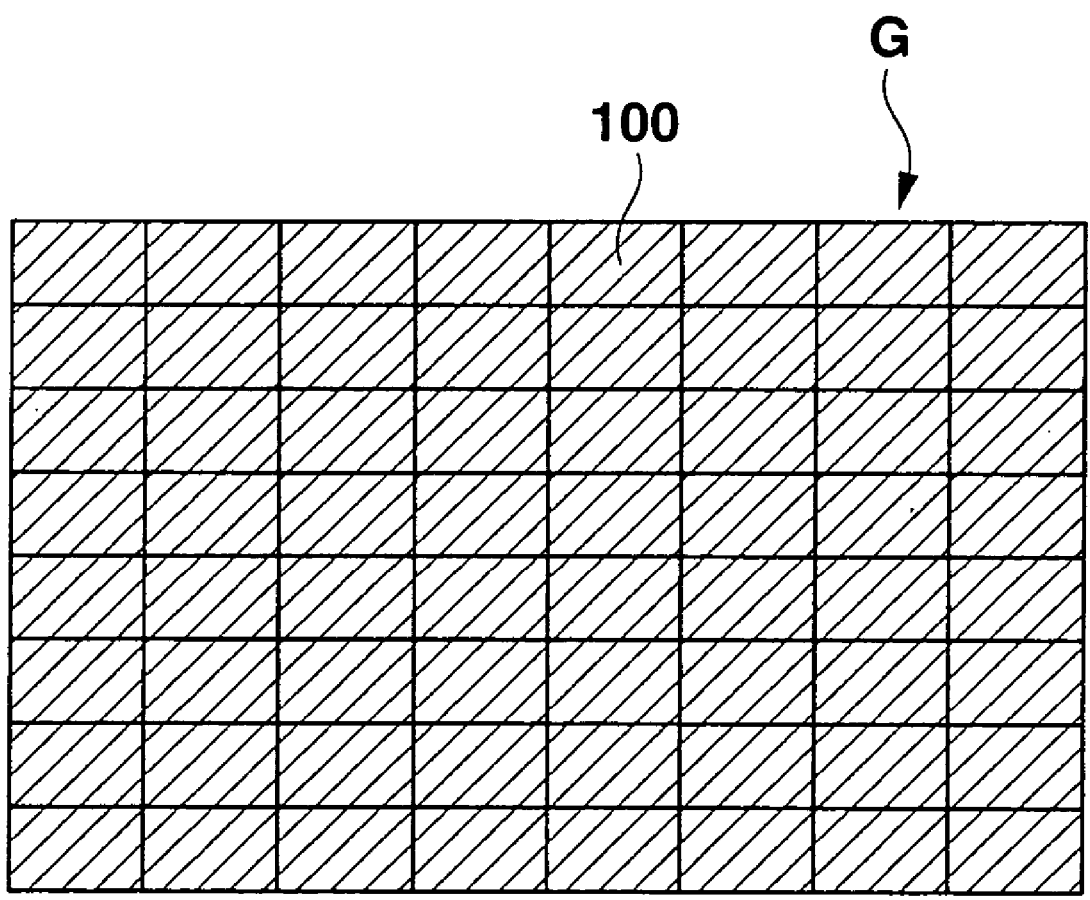
FIG. 9 illustrates the entire area of a taken image.

The digital camera in the photographing mode sequentially takes images of the subject by the CCD 3 while carrying out the exposure control by center-weighted photometry, described previously using FIG. 12, and displaying the taken images of the subject (referred to as simply taken images hereinafter) as through images on the TFT liquid crystal monitor 9. When the shutter is half-pressed (Yes in step SA1), the exposure amount is adjusted (Step SA2). The adjustment is identical to the exposure adjustment which has been carried out immediately before the shutter is half-pressed. More specifically, the adjustment is carried out by controlling the aperture, the shutter speed, and the ISO index from the gain of the AGC amplifier in the analog signal processor 7 such that the average luminance of pixels in the entire area 100 of the current taken image G (See FIG. 9 Area 100 denotes the entire area of the shaded portion) after the weighting process is equal to a reference luminance (YREF) pertinent to the device, the reference luminance being set in advance for each type of digital camera. The exposure adjustment is carried out in consideration of a case where the exposure state remains not settled down at the moment when the shutter is half-pressed, for example, a case where the shutter is half-pressed immediately after the power switch is turned on. The reference luminance (YREF) in the embodiment is "118" in the 8-bit notation (ranging from 0 to 255) indicating luminance that the taken image appears in gray at 18% of the reflectivity.

Figure 8A:
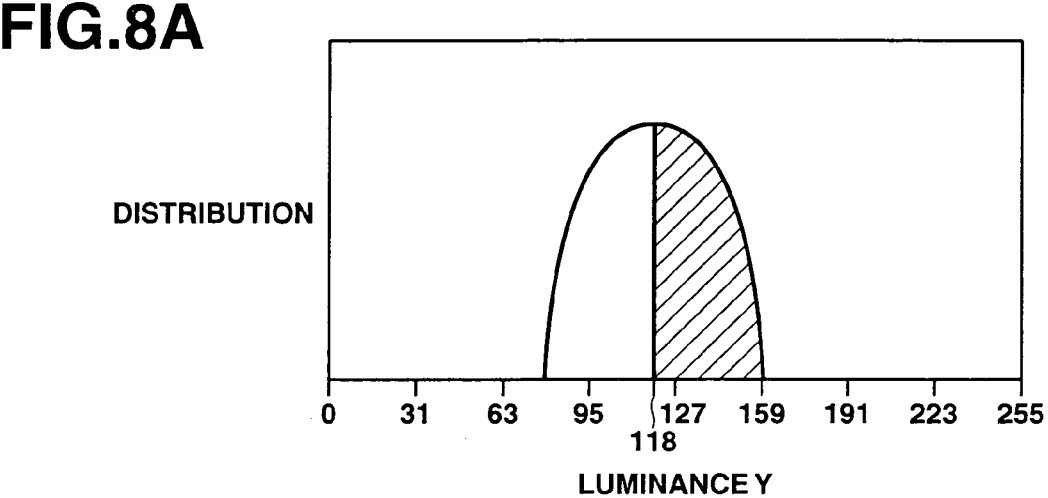
FIG. 8A illustrates a histogram indicative of profile of luminance distribution in the case where the brightness of the subject is uniform when luminance of each pixel in a reference image is expressed in 8-bit notation.
Figure 8B:
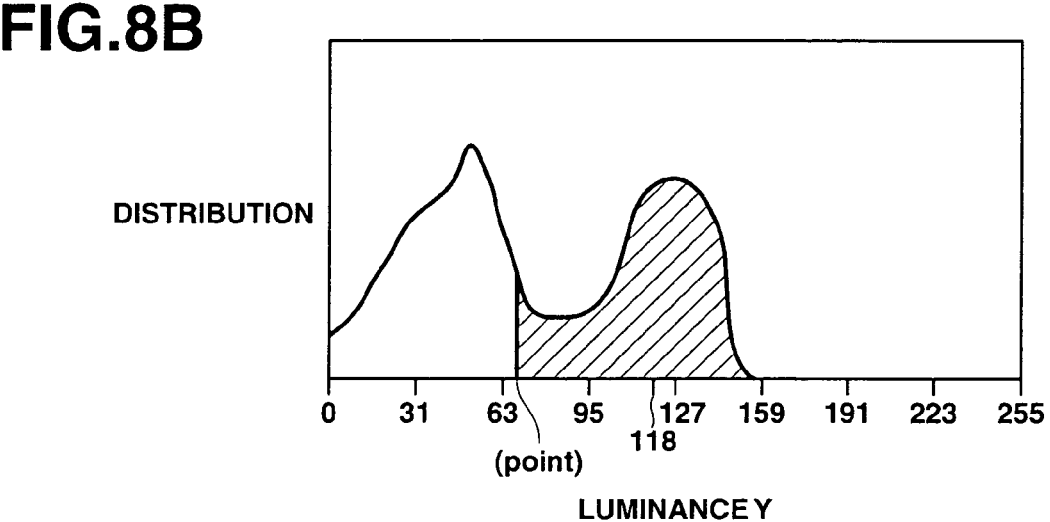
FIG. 8B illustrates a histogram indicative of profile of luminance distribution in the case where the brightness of the subject is higher in the center area than in the peripheral area when luminance of each pixel in a reference image is expressed in 8-bit notation.
Figure 8C:
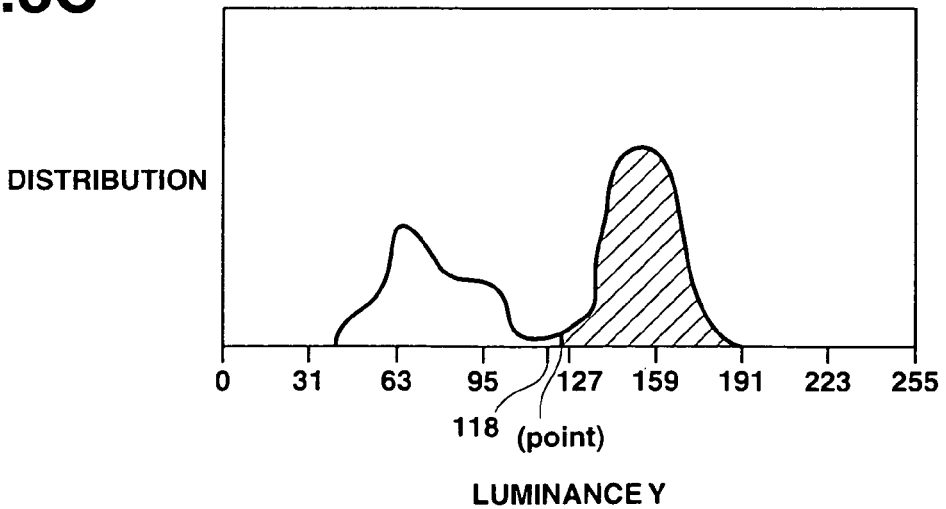
FIG. 8C illustrates a histogram indicative of profile of luminance distribution in the case where the brightness of the subject is lower in the center area than in the peripheral area when luminance of each pixel in a reference image is expressed in 8-bit notation.

Then, when it is determined that the average luminance of pixels of the taken image G after the weighting process is equal to the reference luminance (Yes Step SA3), the following steps are carried out with the taken image in the state as a reference image. First, the reference image will be explained. FIGS. 8A to 8C illustrate histograms showing distribution of the luminance when the luminance of all the pixels in the reference image is expressed in the 8-bit notation. FIGS. 8A to 8C show a difference in luminance distribution profile due to a difference in brightness between the center area and the peripheral area on the subject at different times. More particularly, FIG. 8A indicates a case where the brightness is substantially uniform, FIG. 8B indicates a case where the brightness is higher in the center area than in the peripheral area, and FIG. 8C indicates a case where the brightness is lower in the center area than in the peripheral area.

Examined is the luminance point (referred to as a center luminance point hereinafter) in the reference image where, as the number of pixels has been integrated from the maximum luminance side to the minimum luminance side, the proportion of the integration amount to the total number of pixels is 50% (a half the total number). When the brightness of the subject is substantially uniform as shown in FIG. 8A, the center luminance point stands at "118" of the reference luminance which is equal to the average luminance adjusted through the center-weighted photometry. It is theoretically true that the luminance distribution is not extended when the brightness is substantially uniform. In fact, the luminance distribution is shaped as shown in FIG. 8A due to the effect of shading on the stationary lens 1 (where the intensity of light is declined at the peripheral area as distanced from the optical axis). When the brightness is higher in the center area than in the peripheral area on the subject as shown in FIG. 8B, the center luminance point is the average luminance "118" or less. When the brightness is lower in the center area than in the peripheral area on the subject as shown in FIG. 8C, the center luminance point is the average luminance "118" or more.

Figure 10A:
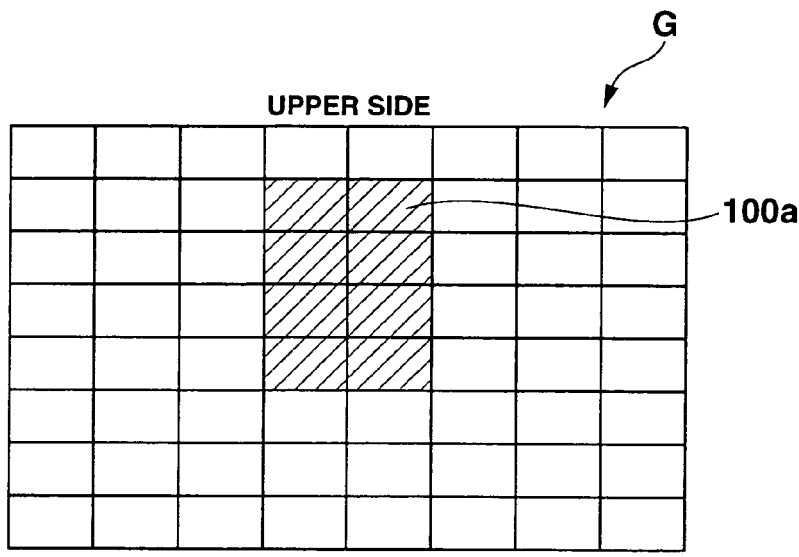
FIGS. 10A to 10C are views showing first to third target regions selectively set as a primary region depending on the orientation of a camera.
Figure 10B:
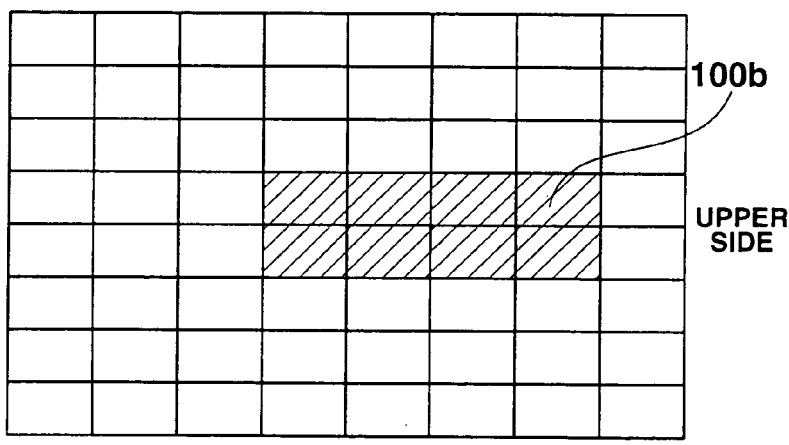
Figure 10C:
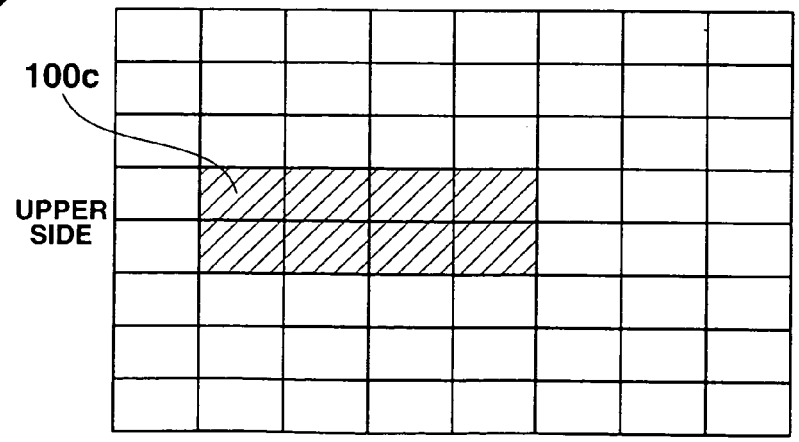

Then, Step SA4 follows where the taken images having the above-explained profiles of the luminance distribution are processed as the reference images. The primary region in the taken image (a predetermined region of the present invention) is set (Step SA4). The primary region represents a range in the entire area 100 of the taken image where the subject is supposed to be present. In the embodiment, the primary region is automatically set from predetermined first to third (hatched) regions 100a to 100c shown in FIG. 10A to respectively, depending on the orientation of the digital camera. More specifically, when the orientation of the camera is normal, the first target region 100a shown in FIG. 10A is set as the primary region. When the camera is vertical with its right end up, the second target region 100b shown in FIG. 10B is set as the primary region. When the camera is vertical with its left end up, the third target region 100c shown in FIG. 10C is set as the primary region. Although the orientation of the camera is determined using a predetermined method of image recognition technique in this embodiment, it may be detected with any hardware device such as an inclination sensor.

Figure 4:
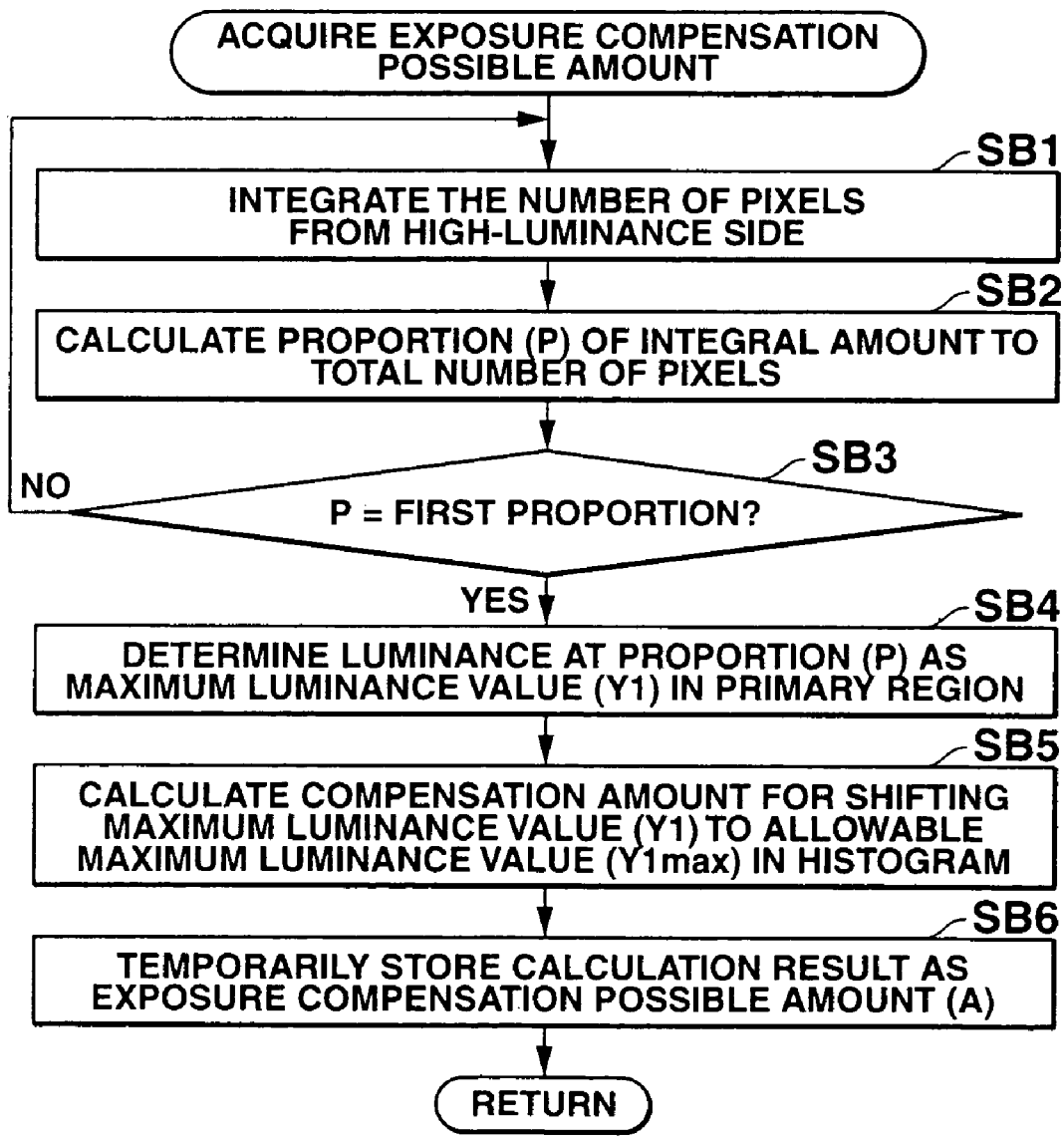
FIG. 4 is a flowchart showing a procedure of acquiring an exposure compensation possible amount.

This is followed by generating a histogram indicative of the luminance distribution in the primary region on the basis of the luminance data of pixels configuring the primary region of the reference image and storing it in the DRAM 13 (Step SA5). The exposure compensation possible amount (A) in the primary region is then determined on the basis of the histogram (Step SA6). FIG. 4 is a flowchart showing a procedure for the processing. The processing starts with integrating the number of pixels from the maximum luminance side to the luminance minimum side in the histogram (Step SB1). This is followed by calculating the proportion (P) of the integration amount to the total number of pixels (Step SB2) and repeating the preceding steps until the calculation result is equal to a first specified percentage set in advance (when No in step SB3). The first specified percentage represents a percentage considered that the appearance of white flickers in the primary region is imperceptible (negligible) as is set to 3% in the embodiment.

Figure 11:
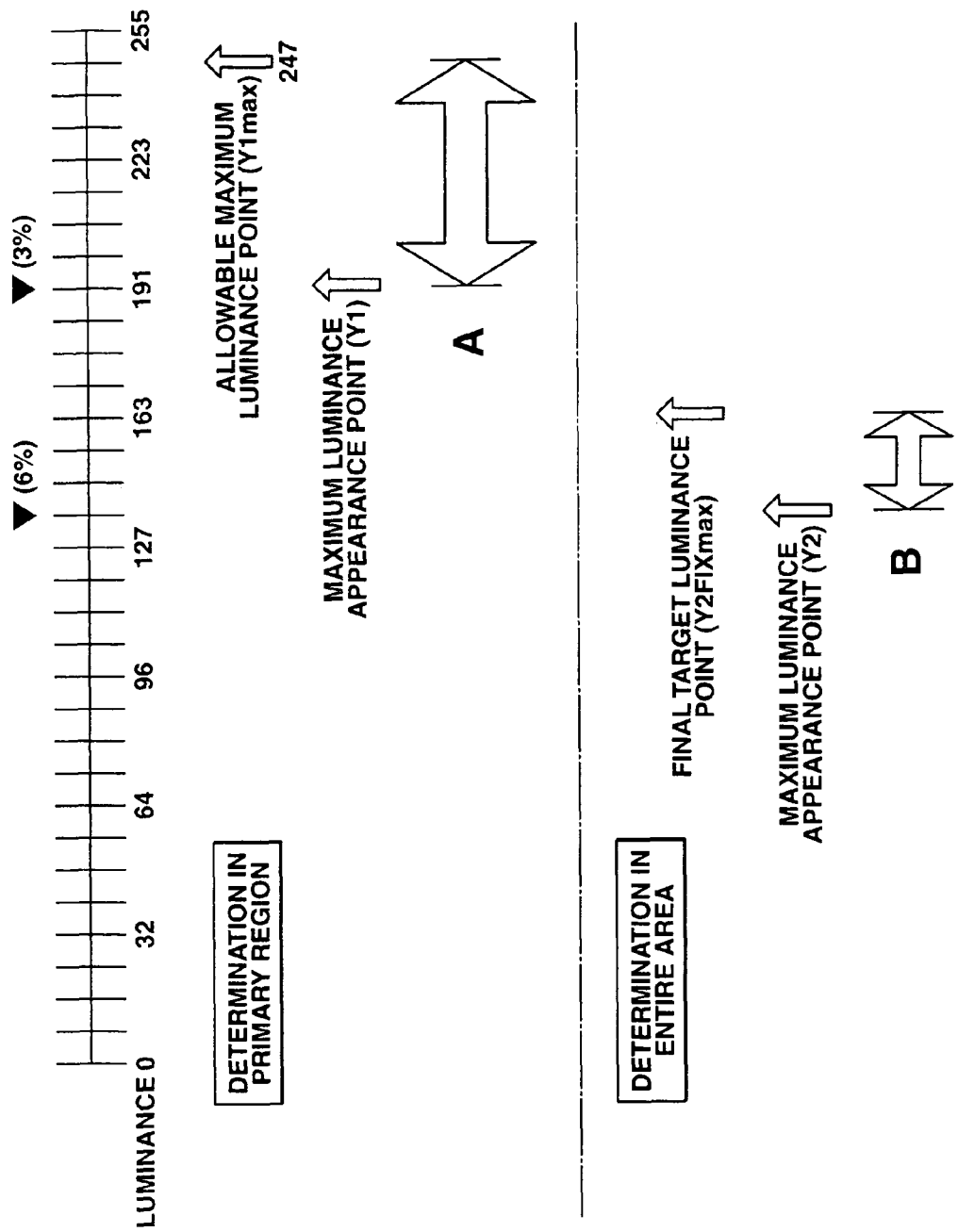
FIG. 11 is an explanatory view showing the relationship between the exposure compensation possible amount and the required exposure compensation amount.

When the proportion is equal to the first specified percentage (Yes in step SB3), the luminance at the moment is at the nominal maximum luminance value (Y1) in the primary region (Step SB4). Then, as shown in the upper half of FIG. 11, the compensation amount of the exposure is calculated which is needed for modifying the histogram such that the maximum luminance (Y1) point (the maximum luminance appearance point; at "191" in the figure) is shifted to an allowable maximum luminance (Y1max) position (at "247" in the figure) which has been predetermined to have a white blank imperceptible in the sight (Step SB5), and the calculated value is temporarily stored as the exposure compensation possible amount (A) (Step SB6). The exposure compensation possible amount (A) is exposure upper-limit information of the present invention. It should be noted that the exposure compensation possible amount (A) is calculated in consideration of the shape of γ curve for image pickup.

After the exposure compensation possible amount (A) has been obtained, the processing returns to the main flow shown in FIG. 3 where data of the histogram which has been explained in FIGS. 8A to 8C is generated on the basis of luminance data of all the pixels in the entire area 100 of the reference image G and stored in the DRAM 13 (Step SA7).

Figure 5:
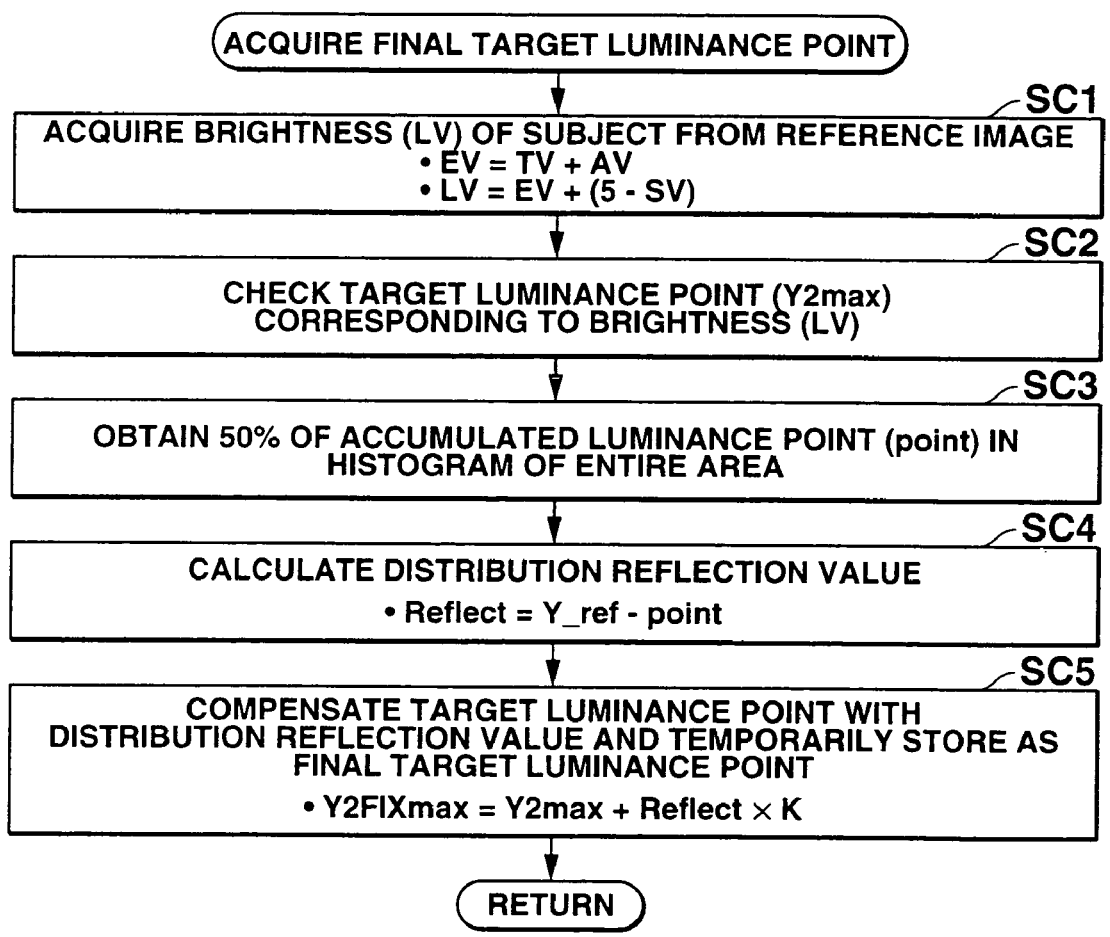
FIG. 5 is a flowchart showing a procedure of acquiring a final target luminance point.

Then, the final target luminance point (Y2FIXmax) corresponding to a brightness distribution of each region on the subject is obtained (Step SA8). FIG. 5 is a flowchart showing a procedure of the processing. In the processing, the brightness of the subject when the reference image G is taken is obtained from the following equations using the exposure control parameters which have been set for the exposure adjustment in step SA2:

$$EV=TV+AV$$

$$LV=EV+(5-SV)$$

where TV is the shutter speed, AV is the aperture opening, and SV is the ISO index (Step SC1).

This is followed by acknowledging the target luminance point (Y2max) corresponding to the brightness (LV) of the subject by using the above-described optimum luminance distribution table T (see FIG. 2) (Step SC2), and calculating the center luminance point in the histogram of the entire area described using FIGS. 8A to 8C (Step SC3). A difference between the luminance at the center luminance point and the average luminance (Y_ref) is then calculated as a distribution reflection value (Rflect) (Step SC4). The distribution reflection value is one item of the relevant information of the invention indicative of a difference in brightness between the center area and the peripheral area on the subject at different times. When the distribution reflection value is a positive value, the brightness is higher in the center area than in the peripheral area on the subject as shown in FIG. 8B. When the distribution reflection value is a negative value, the brightness is lower in the center area than in the peripheral area on the subject as shown in FIG. 8C. The absolute value of the distribution reflection value indicates a degree of difference in brightness between the center area and the peripheral area on the subject.

Thereafter, the target luminance point corresponding to the brightness of the subject at the moment is compensated by using the distribution reflection value, i.e., using the following equation:

$$Y2FIXmax=Y2max+Rflect \times K.$$

The compensation resultant is temporarily stored as the final target luminance point (Y2FIXmax) (Step SC5). In the above equation, K is the correction factor peculiar to the device and predetermined for each kind of digital camera.

Figure 6:
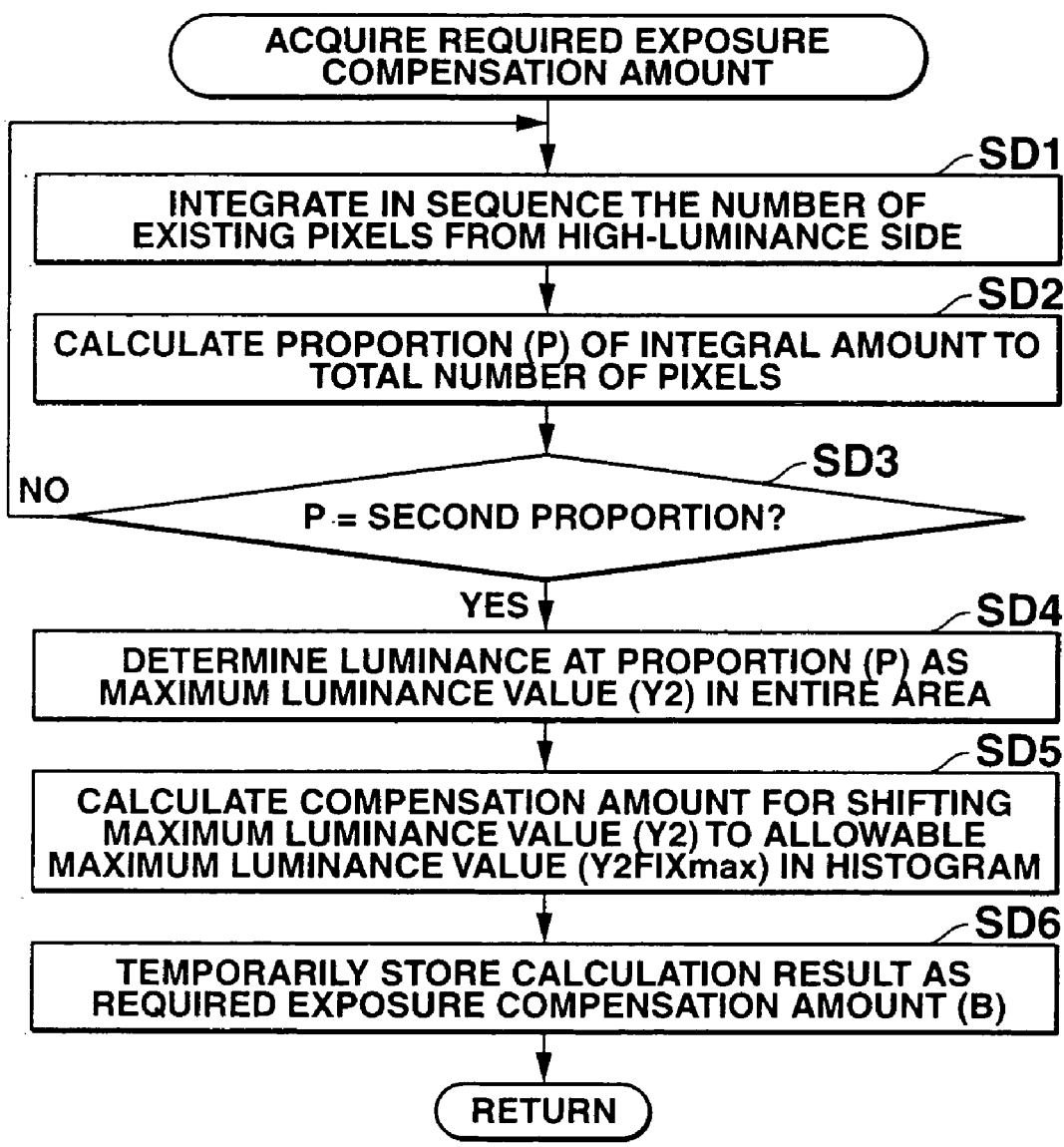
FIG. 6 is a flowchart showing a procedure of acquiring a required exposure compensation amount.

After the final target luminance point has been calculated, the processing returns to the main flow shown in FIG. 3 where a required exposure compensation amount (B) is calculated on the basis of the histogram in the entire area 100 generated in step SA7 (Step SA9). The required exposure compensation amount (B) is a fundamental exposure compensation amount needed for obtaining the proper exposure as well as for producing a desired luminance distribution which correctly indicates a difference in brightness between the center area and the peripheral area on the subject in the entire area 100 of the reference image. The processing of obtaining the required exposure compensation amount (B) is hence carried out as shown in a flowchart of FIG. 6, in the same manner as in the exposure compensation possible amount (A) described with FIG. 4.

The processing starts with integrating the number of pixels from the maximum luminance side to the minimum luminance side in the histogram of the entire area 100 (Step SD1), sequentially calculating the proportion (P) of the integration amount to the total number of pixels (Step SD2), and repeating the preceding steps until the calculation result is equal to a predetermined second specified percentage set (No in step SD3). The second specified percentage represents a proportion of pixels which allow the appearance of white flickers in the entire area 100 as is set greater than 3% of the first specified percentage and 6% in the embodiment. When the calculated percentage reaches the second specified percentage, the luminance at the moment is at the nominal maximum luminance value (Y2) in the entire area 100 (Step SD4). Thereafter, as shown in the lower half of FIG. 11, the compensation amount of the exposure is calculated which is needed for modifying the histogram such that the maximum luminance value (Y2) point (the maximum luminance appearance point; at "136" in the figure) is shifted to the above-described final target luminance point (Y2FIXmax; at 163 in the figure) (Step SD5), and then temporarily stored as the required exposure compensation amount (B) (Step SD6). It should also be noted that the required exposure compensation amount (B) is determined in consideration of the shape of γ curve for image pickup.

Figure 7:
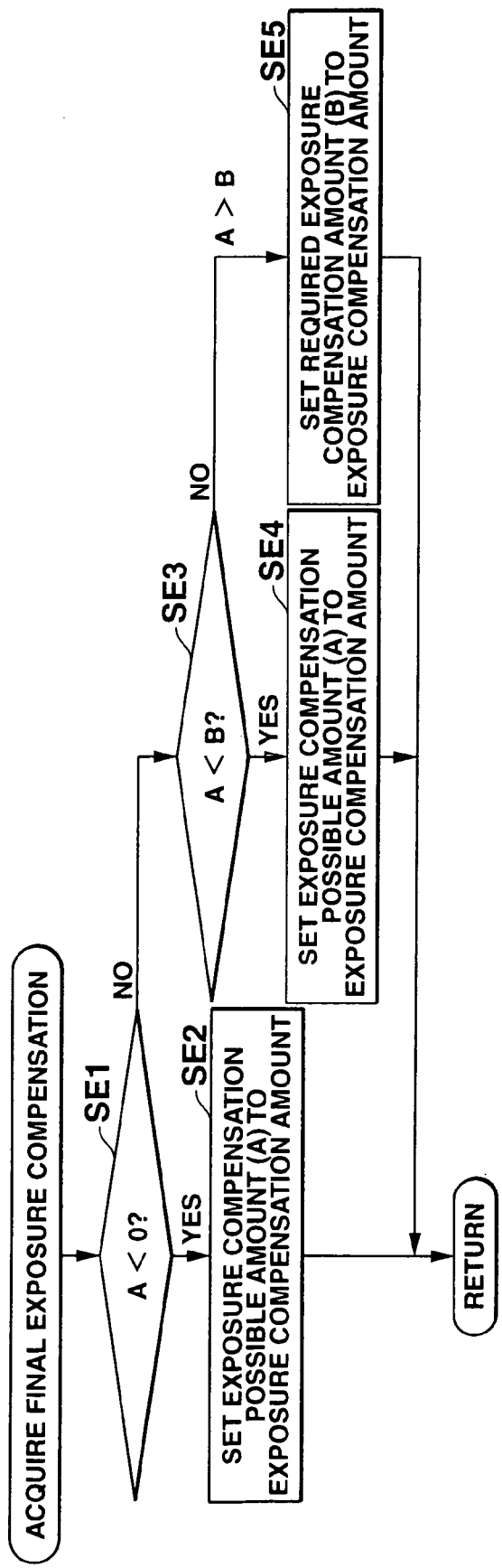
FIG. 7 is a flowchart showing a procedure of acquiring a final exposure compensation amount.

After the required exposure compensation amount (B) has been determined, the processing returns to the main flow shown in FIG. 3 where the actual exposure compensation amount is set on the basis of the exposure compensation possible amount (A) acquired in step SA6 and the required exposure compensation amount (B) (Step SA10). FIG. 7 is a flowchart showing a procedure of the processing. When the exposure compensation possible amount (A) is greater than the required exposure compensation amount (B) (No in both Steps SE1 and SE3), it is determined that the primary region (such as the first target region 100a) generates no white flickers, and the required exposure compensation amount (B) is set as the actual exposure compensation amount (Step SE5). When the exposure compensation possible amount (A) is smaller than the required exposure compensation amount (B) (No in step SE1 and Yes in step SE3), it is determined that white flickers are generated in the primary region by the exposure compensation based on the brightness in the entire area 100 of the reference image, and the exposure compensation possible amount (A) is set as the actual exposure setting (Step SE4). When the exposure compensation possible amount (A) is a negative compensation amount (Yes in step SE1), i.e., 3% or more of the pixels exceed the allowable maximum luminance (Y1max) in the primary region which thus creates white flickers, the exposure compensation possible amount (A) is set as the actual exposure setting regardless of the required exposure compensation amount (B) (Step SE2).

Thereafter, the processing returns to the main flow shown in FIG. 3 where it is determined whether or not the shutter is fully pressed. When the shutter is not pressed (No in step SA11), the processing goes back to Step SA1 for repeating the steps. When the shutter is fully pressed down (Yes in step SA11), the aperture, the shutter speed, and the AGC gain are controlled based in the program chart in response to the exposure compensation amount set in Step SA10 with respect to the exposure amount adjusted in step SA2, that is the exposure amount when the average luminance of the pixels in the entire area 100 of a taken image is set as the reference luminance, thereby controlling the photographing light amount (Step SA12).

As described, the exposure control of the embodiment, like the prior art, can be carried out on the basis of the brightness of the entire area of an image so long as no white flickers appear in the primary region (such as the first to third target regions 100a to 100c). Particularly unlike the prior art, in the embodiment, the required exposure compensation amount (B), which is a fundamental exposure compensation amount required for achieving the proper exposure, is acquired as follows. That is, the target luminance point (Y2max) corresponding to the brightness of the subject is compensated with the distribution reflection value (Rflect) indicative of a difference in brightness between the center area and the peripheral area on the subject at different times, and the required exposure compensation amount (B) is acquired by using the final target luminance point (Y2FIXmax) after being compensated. Accordingly, the difference (a degree of difference) in brightness between the center area and the peripheral area on the subject at different times can be reflected in the compensation amount.

Consequently, the taken image can be prevented from appearing dimmer over the entire area than the actual view when the brightness of the subject is higher in the center area than in the peripheral area, or more glaring than the actual view when the brightness of the subject is lower in the center area than in the peripheral area. Therefore, the center area of the taken image appears at a proper level of the brightness. For example, when a person in a white cloth or a white flower stands at the center of the taken image and is illuminated directly by the sunlight, its whiteness can be shown favorable in the brightness. Also, when a person stands at the center of a snowy landscape image, the entire area of the taken image will be prevented from appearing too glaring. The result of the exposure control can be improved as closer to an actual view.

Also, the distribution reflection value (Rflect) which is a difference between the center luminance point and the average luminance (Y_ref) in the histogram of the entire area of the reference image is used as the relevant information indicative of a difference in brightness between the center area and peripheral area on the subject. This allows the difference in brightness between the predetermined area and the other area on the subject to be determined easily and accurately and to be reflected in the control target proper exposure during the photographing. As the exposure control is improved in the accuracy, the brightness in the entire area of a taken image can be expressed closer to its actual view.

Although the center luminance point and the average luminance (Y_ref) are determined at the point in the histogram of the entire area of the reference image where the number of pixels is integrated from the maximum luminance side to the minimum luminance side and its proportion to the total number of pixels is 50%, the proportion may be other than 50%. In the latter case, it is difficult to accurately determine a difference in brightness between the predetermined area and the other area on the subject.

The present invention has described the exposure control based on the brightness throughout the taken image so long as no white flickers appear in the primary range of the image, but not limited thereto. The invention may be applied to an exposure control for determining proper exposure on the basis the histogram information indicative of a luminance distribution of pixels in the entire area of the taken image which is measured by the center-weighted photometry regardless of the appearance of white flickers. In such a case, the exposure control can be improved to develop a result closer to an actual view. Also, the center-weighted photometry may be replaced by another weighted photometry method where a desired area in the taken image is weighted other than the center or peripheral area. Although the exposure control is carried out with the use of center-weighted photometry even before the shutter is pressed to a half in the embodiment, it may be conducted with any other photometry method than the center-weighted photometry.

The above description has been made for the case of employing the present invention to a digital camera. However, the invention may be applied with equal success to any other image pickup apparatus equipped with a solid state image pickup device such as CCD or CMOS, or an information equipment built-in image pickup apparatus such as a camera built-in mobile telephone or a camera built-in PDA.

What is claimed is:

1. An image pickup apparatus having an image pickup device which images a subject, comprising:
    a weighting unit which weights luminance information of a plurality of pixels in a predetermined area with respect to luminance information of a subject image taken by the image pickup device;
    an exposure control unit which conducts an exposure at a time of imaging the subject by the image pickup device based on the luminance information obtained by weighting the luminance information of the plurality of pixels in the predetermined area by the weighting unit;
    a relevant information acquisition unit which acquires relevant information as a distribution reflection value indicative of a distribution pattern of a brightness in a reference image based on luminance information of the reference image which has been taken by an image pickup operation involving exposure control of the exposure control unit immediately before the subject is regularly imaged by the image pickup device;
    a generating unit which generates information indicative of a luminance distribution of all the plurality of pixels based on the luminance information of the reference image taken by the image pickup device, the information being arranged in descending order with respect to pixel luminance value;
    a storage unit which stores proper exposure information indicative of a proper exposure corresponding to a brightness of the subject;
    a photometry unit which measures the brightness of the subject when the reference image is taken by the image pickup device;
    a compensating unit which compensates the proper exposure information stored in the storage unit in response to the brightness of the subject measured by the photometry unit, in accordance with the relevant information acquired by the relevant information acquisition unit, wherein the compensated proper exposure information is an exposure compensation amount needed for obtaining the proper exposure and for producing a desired luminance distribution; and
    a control unit which controls the exposure control unit to perform exposure control for the proper exposure indicated by the compensated proper exposure information when the subject is regularly imaged by the image pickup device;
    wherein the relevant information acquisition unit acquires the relevant information as the distribution reflection value by calculating a difference between a luminance value at a luminance point where an accumulated number of a part of the plurality of pixels from a high-luminance side is equal to a half of a total number of the plurality of pixels in the luminance distribution in the reference image and the luminance value at the luminance point in a case when the brightness is uniform in the reference image.

2. An image pickup apparatus according to claim 1, wherein the photometry unit measures the brightness of the subject when the reference image is taken based on contents of the exposure control by the exposure control unit during the imaging of the reference image.

3. An image pickup apparatus according to claim 1, further comprising:
    a exposure upper-limit acquisition unit which acquires exposure upper-limit information indicative of an exposure upper-limit applicable in a predetermined primary region of the reference image based on luminance information of the primary region,
    wherein the control unit, when the subject is regularly imaged by the image pickup device, causes the exposure control unit to perform exposure control for proper exposure indicated by the proper exposure information after being compensated by the compensating unit in a range not exceeding the exposure upper-limit indicated by the exposure upper-limit information acquired by the exposure upper-limit acquisition unit.

4. An exposure control method for use in an image pickup apparatus having an image pickup device for imaging a subject, the method comprising:
    weighting luminance information of a plurality of pixels in a predetermined area with respect to luminance information of a subject image taken by an image pickup device, and performing exposure control based on the weighted luminance information, immediately before the subject is regularly imaged by the image pickup device;
    acquiring relevant information as a distribution reflection value indicative of a distribution pattern of a brightness in a reference image based on luminance information of the reference image which has been taken by an image pickup operation involving exposure control immediately before the subject is regularly imaged by the image pickup device;
    generating information indicative of a luminance distribution of all the plurality of pixels based on the luminance information of the reference image taken by the image pickup device, the information being arranged in descending order with respect to pixel luminance value;
    compensating proper exposure information indicative of a proper exposure determined in response to a brightness of the subject when the reference image is taken, in accordance with the acquired relevant information, wherein the compensated proper exposure information is an exposure compensation amount needed for obtaining the proper exposure and for producing a desired luminance distribution; and
    performing exposure control for the proper exposure indicated by the compensated proper exposure information when the subject is regularly imaged by the image pickup device;
    wherein the acquiring the relevant information as the distribution reflection value includes calculating a difference between a luminance value at a luminance point where an accumulated number of a part of the plurality of pixels from a high-luminance side is equal to a half of a total number of the plurality of pixels in the luminance distribution in the reference image and the luminance value at the luminance point in a case when the brightness is uniform in the reference image.

5. A computer-readable recording medium having a computer program stored thereon that is executable by a computer to control an image pickup apparatus having an image pickup device configured to image a subject to function as:
    a weighting unit which weights luminance information of a plurality of pixels in a predetermined area with respect to luminance information of a subject image taken by the image pickup device;
    an exposure control unit which conducts an exposure at a time of imaging the subject by the image pickup device based on the luminance information obtained by weighting the luminance information of the plurality of pixels in the predetermined area by the weighting unit;

a relevant information acquisition unit which acquires relevant information as a distribution reflection value indicative of a distribution pattern of a brightness in a reference image based on luminance information of the reference image which has been taken by an image pickup operation involving the exposure control of the exposure control unit immediately before the subject is regularly imaged by the image pickup device;

a generating unit which generates information indicative of a luminance distribution of all the plurality of pixels based on the luminance information of the reference image taken by the image pickup device, the information being arranged in descending order with respect to pixel luminance value;

a storage unit which stores proper exposure information indicative of a proper exposure corresponding to a brightness of the subject;

a photometry unit which measures the brightness of the subject when the reference image is taken by the image pickup device;

a compensating unit which compensates the proper exposure information stored in the storage unit in response to the brightness of the subject measured by the photometry unit, in accordance with the relevant information acquired by the relevant information acquisition unit, wherein the compensated proper exposure information is an exposure compensation amount needed for obtaining the proper exposure and for producing a desired luminance distribution; and a control unit which causes the exposure control unit to perform exposure control for the proper exposure indicated by the compensated proper exposure information when the subject is regularly imaged by the image pickup device;

wherein the relevant information acquisition unit acquires the relevant information as the distribution reflection value by calculating a difference between a luminance value at a luminance point where an accumulated number of a part of the plurality of pixels from a high-luminance side is equal to a half of a total number of the plurality of pixels in the luminance distribution in the reference image and the luminance value at the luminance point in a case when the brightness is uniform in the reference image.

* * * * *